A. D. THOMAS.
Assignor to D. H. THOMAS.
COTTON PRESS.
No. 10,902. Reissued Feb. 14, 1888.
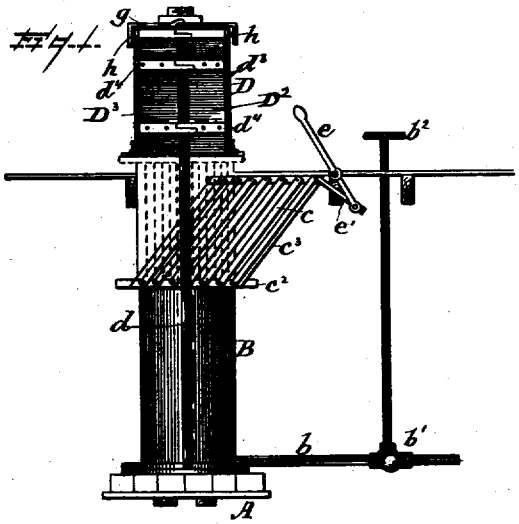
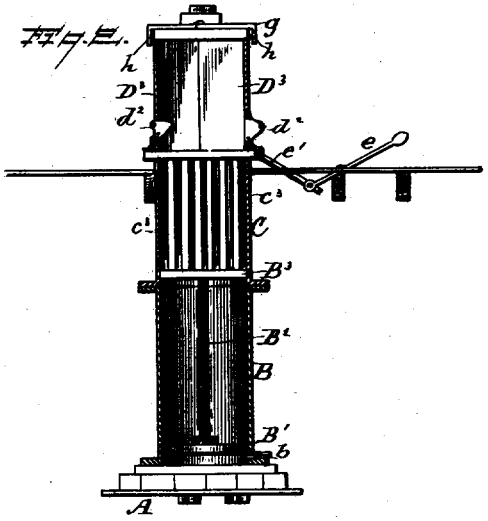
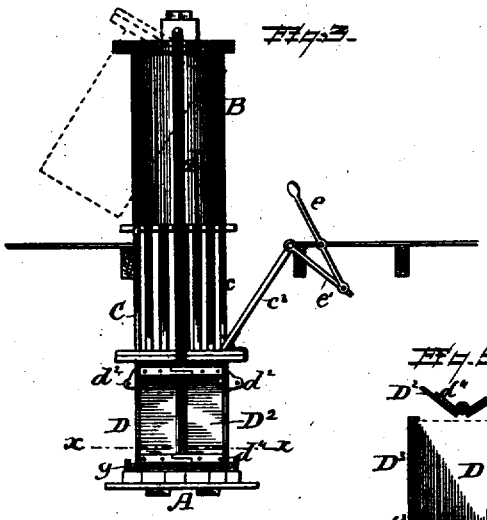
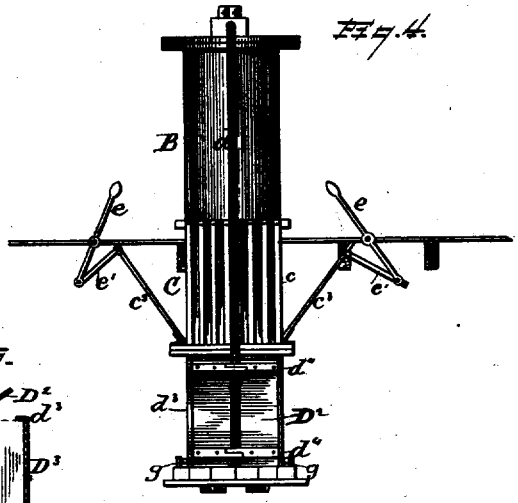
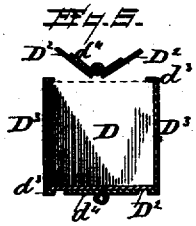
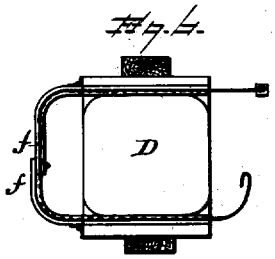
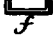
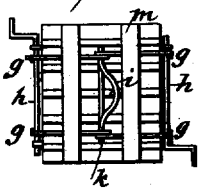
Witnesses:
C. Wurdemann.
I. J. Masson.
Inventor:
Abner D. Thomas.
by E. E. Masson.
Atty.
N. PETERS, Photo-Lithographer, Washington, D. C.

UNITED STATES PATENT OFFICE.

ABNER D. THOMAS, OF LITTLE ROCK, ASSIGNOR TO DANIEL H. THOMAS, OF PULASKI, ARKANSAS.

COTTON-PRESS.

SPECIFICATION forming part of Reissued Letters Patent No. 10,902, dated February 14, 1888.

Original No. 354,270, dated December 14, 1886. Application for reissue filed May 20, 1887. Serial No. 238,925.

*To all whom it may concern:*

Be it known that I, ABNER D. THOMAS, a citizen of the United States, residing at Little Rock, in the county of Pulaski and State of Arkansas, have invented certain new and useful Improvements in Cotton or Hay Presses, of which the following is a specification, reference being had therein to the accompanying drawings.

My invention relates to improvements in cotton or hay presses in which the material is forced into the compressing-chamber either from above or from under by means of a steam-piston or other suitable devices; and the objects of the improvements are to facilitate the filling of the baling-chamber and also to facilitate the passage of the bale-ties around the bale and the removal of said bale from the press. I attain these objects by the construction illustrated in the accompanying drawings, in which—

Figure 1 is a side view of a steam-press constructed in accordance with my invention, the filling-chamber being shown as tilted or open. Fig. 2 is a vertical section of the same with the filling-chamber swung back in line with the compressing-cylinder and bale-chamber, the latter being at the top. Fig. 3 is a side view of a press constructed in accordance with my invention, but with the bale-chamber at the bottom and the compressing-cylinder above the filling-chamber. Fig. 4 is a side view of a similar press with both the front and the rear of the filling-chamber open. Fig. 5 is a horizontal section on line *x x* of Fig. 3 of the bale-chamber, showing as open two of the end doors hinged upon one of the main vertical braces. Fig. 6 is a side view showing the bale-chamber provided with bale-tie-returning guides constructed in accordance with my invention. Fig. 7 is an end view of said bale-tie guide upon a large scale. Fig. 8 is a top view of the bale-chamber.

In the drawings, A represents the foundation of the press, upon which is placed in Figs. 1 and 2 the vertical steam-cylinder B, provided with a steam-supply pipe, *b*, having regulating-valve *b'*, the stem of which is extended upward to an accessible locality, as at $b^2$, on the floor above, in order that the operation of the piston may be controlled at will. The cylinder may also be supplied with a suitable exhaust-pipe, and within said cylinder is the piston B', carrying at the opposite end of its rod or rods $B^2$ the plunger $B^3$, made to enter the cotton-receiving chamber C, and immediately above or under said receiving-chamber is the cotton compressing chamber D. The latter, with the receiving-chamber and the steam-cylinder, are kept united by the vertical rods or tubes *d* and the necessary transverse beams.

To facilitate the filling of the receiving-chamber, its sides are hinged at or near the bottom, and two of them may be formed of slats *c*, having their ends pivoted to horizontal bars $c^2$, so that they can be inclined, as shown in Fig. 1, from under the compressing-chamber, and for that purpose the slats do not quite touch each other when in a vertical position; but when slightly inclined they form with the sides $c^3$ a close box to receive the cotton. After said box has been filled it is swung back directly in line with the baling-chamber D, by means of the lever *e* and connecting-rod *e'*, having one end pivoted to the frame of the receiving-chamber, and retained in that position either by means of said lever or by means of hooks, bolts, or other suitable fastenings. Steam is then admitted into the cylinder B, and the charge of cotton introduced in the receiving-chamber C is forced into the baling or compressing chamber D, where it is retained by means of pivots or dogs $d^2$, fully described in my patent, No. 309,995, of December 30, 1884. The bale is then tied, and to facilitate this operation and dispense with an assistant the rear end of the baling-chamber is provided with independent grooved or trough-shaped telescoping metal guides *f*, to direct the bale-tie bands from the grooves of the upper platen into the grooves of the under platen and back to the front of the bale, as shown in Fig. 6. Each guide *f* is preferably made in two lengths, hinged to the frame or platens, and adapted to slide or telescope upon each other to suit different-sized bales.

The end doors, $D^2$, of the baling-chamber are retained closed by means of cleats $d^3$, projecting from the side edges of the front and rear doors, $D^3$. These doors $D^3$ are hinged, as usual, to the bottom frame of the baling-chamber, and have their upper edges retained together by hooked rods *g*, hinged at their inner ends upon the same rod, *k*, and having their outer end hooking automatically down on a roller or a long cylindrical rod, *h*, pivoted on the outside of the top batten or cleat of the side doors, which roller is provided with a lever or crank-handle, by the turning up of which the hooked rods *g* become unhooked or allow the side doors to open.

To overcome the objection of freeing only one side of the bale at once, the hooked rods *g* are held in the center of the head-block by a rod, *k*, secured to a spring, *i*, which is secured to one of the transverse bars *m* of the head-block, so that when the door on one side is loosened it allows the opposite side to open sufficiently to relieve the pressure, as the spring carries the four hooked rods with it. To facilitate the removal of the bale from the chamber D, each one of the ends is formed of two doors hinged upon the vertical brace-rods *d*. The straps of said hinges are shown at $d^4$, and their looped ends embrace the rods *d*.

To facilitate the filling of the cotton-receiving chamber C, either the baling-chamber or the operating-cylinder may be hinged above it, as shown in dotted lines in Fig. 3, or both the front and rear be open, in which case closed ends are used between the outermost of the slats *c* and the sides $c^3$, and each of the latter sides is closed with a hinged lever, *e*, as above stated.

Having now fully described my invention, I claim—

1. In a cotton or hay press, the combination of a compression-chamber, its support, and platen, with a receiving-chamber having both of its sides hinged at or close to the bottom thereof, and hinged levers pivoted thereto to close and to open said sides, substantially as described.

2. The combination of a steam-cylinder, a compressing-chamber, and a receiving-chamber between them and having one of its sides hinged at the bottom to a horizontal bar, with the connecting-rods uniting the foundation to the top beam of the press, substantially as and for the purpose described.

3. The combination of a steam-cylinder, a compressing-chamber, and a receiving-chamber between them and having its sides formed of slats hinged at the bottom to horizontal bars, with operating-levers, substantially as and for the purpose described.

4. The combination of a steam-cylinder, a compressing-chamber, a receiving-chamber between them, and with the connecting-rods uniting the foundation to the top beam of the press, and the end doors of the compressing-chamber hinged upon said connecting-rods, substantially as and for the purpose described.

5. The combination of the grooved upper and lower platens of a compressing-chamber, with independent trough-shaped metal guides *f*, extending from one platen to the other, substantially as and for the purpose described.

6. The combination of a compressing-chamber, a filling-chamber having its sides hinged above the latter, and a steam-cylinder above the filling-chamber, with the connecting-rods *d*, supporting said steam-cylinder and forming the pivot for the end doors and for the cylinder, substantially as and for the purpose described.

7. The combination of the baling-chamber, the platen, the side doors, $D^3$, and the crank-rods *h*, pivoted thereto, with the hooked rods *g*, engaging with said crank-rods and hinged together by a rod, and spring *i*, substantially as and for the purpose described.

ABNER D. THOMAS.

Witnesses:
D. REEVE,
J. RICHARD.